(12) United States Patent
Suzuki et al.

(10) Patent No.: US 11,543,052 B2
(45) Date of Patent: Jan. 3, 2023

(54) VALVE DEVICE

(71) Applicant: JTEKT CORPORATION, Osaka (JP)

(72) Inventors: Takuya Suzuki, Anjo (JP); Kazuki Okamura, Okazaki (JP); Takashi Yamazaki, Kazaki (JP); Toshihiko Shima, Okazaki (JP); Kazushi Numazaki, Toyota (JP); Naohiro Sakamoto, Okazaki (JP); Akio Nakamura, Okazaki (JP); Koji Kida, Toyota (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 16/386,322

(22) Filed: Apr. 17, 2019

(65) Prior Publication Data

US 2019/0323626 A1 Oct. 24, 2019

(30) Foreign Application Priority Data

Apr. 20, 2018 (JP) .............................. JP2018-081522

(51) Int. Cl.
*F16K 39/04* (2006.01)
*F16K 5/06* (2006.01)
(Continued)

(52) U.S. Cl.
CPC ............ *F16K 39/04* (2013.01); *F16K 5/0626* (2013.01); *F16K 15/021* (2013.01); *F16K 27/0209* (2013.01); *Y10T 137/87917* (2015.04)

(58) Field of Classification Search
CPC ...... F16K 39/04; F16K 5/0626; F16K 15/021; F16K 27/0209; F16K 1/443;
(Continued)

(56) References Cited

U.S. PATENT DOCUMENTS 2,421,659 A * 6/1947 Sutton ................... F16L 17/073
277/612
2,466,527 A * 4/1949 Wolfram ................. F16L 19/08
285/343
(Continued)

FOREIGN PATENT DOCUMENTS

CN 104344214 A 2/2015
JP H05-215299 A 8/1993
(Continued)

OTHER PUBLICATIONS

Definition for "abut", retrieved from the internet on Dec. 20, 2021 taken from [www.dictionary.com] (Year: 2021).*
(Continued)

*Primary Examiner* — Craig J Price
(74) *Attorney, Agent, or Firm* — Oliff PLC

(57) ABSTRACT

A valve device includes a body, a joint, a check valve, a valve seat fixation member having an outer peripheral surface on which an external thread is provided, and a sealing member. The body has an attachment hole that attaches the joint and the valve seat fixation member from an outside of the body in a sequence of the joint and the valve seat fixation member, and that has an inner peripheral surface in which an internal thread screwed to the external thread of the valve seat fixation member is provided. The sealing member is provided between the joint and the valve seat fixation member. An outer peripheral edge of the sealing member is located radially inward of a screwed region of the internal thread and the external thread.

1 Claim, 4 Drawing Sheets

(51) Int. Cl.
*F16K 15/02* (2006.01)
*F16K 27/02* (2006.01)

(58) Field of Classification Search
CPC ...... F16K 27/0254; F16K 1/422; F16K 1/385; F16K 15/025; F16K 15/063; F16K 15/184; F16K 15/18; Y10T 137/87917; F16J 15/0818–0893; F16J 2015/0837–0875; B01D 46/2411; F17C 13/04; F17C 2270/0168; F17C 2223/036; F17C 2221/012; F17C 2221/013; F17C 2221/014; F17C 2221/033; F17C 2221/035; F17C 2205/0335; F17C 2205/0382; F17C 2205/0385; F17C 2205/0323; Y02E 60/32
USPC ..... 137/613, 512, 512.1, 513; 285/355, 392, 285/379; 29/888.3, 898.11, 402.2; 277/401
See application file for complete search history.

(56) References Cited

U.S. PATENT DOCUMENTS

| | | | |
|---|---|---|---|
| 2,836,193 A | 5/1958 | Giuliano et al. | |
| 3,831,951 A * | 8/1974 | Patel | F16J 15/062 277/641 |
| 4,239,242 A * | 12/1980 | Burns | F16J 15/025 277/612 |
| 4,519,636 A * | 5/1985 | Tomlin | E21B 33/0355 285/95 |
| 4,529,231 A * | 7/1985 | Greenawalt | F16L 19/12 285/342 |
| 4,583,722 A * | 4/1986 | Wallis | B21D 24/02 267/119 |
| 4,723,797 A * | 2/1988 | Veyrat | F16L 37/23 137/614.05 |
| 4,865,360 A * | 9/1989 | Adams | F16K 11/20 285/142.1 |
| 4,867,489 A * | 9/1989 | Patel | F16L 19/106 285/342 |
| 4,920,626 A * | 5/1990 | Nimberger | F16L 41/008 29/282 |
| 5,000,488 A * | 3/1991 | Albrecht | F16L 23/0283 285/12 |
| 5,033,435 A * | 7/1991 | Ostarello | F16L 19/0218 123/469 |
| 5,232,021 A * | 8/1993 | Smith | E21B 33/0355 137/614.04 |
| 5,338,075 A * | 8/1994 | Albrecht | F16L 23/00 285/12 |
| 5,366,261 A * | 11/1994 | Ohmi | F16L 19/0212 285/328 |
| 5,490,680 A * | 2/1996 | Patel | F16J 15/062 277/608 |
| 5,899,194 A * | 5/1999 | Iwatsuki | F02M 21/0239 123/527 |
| 6,022,052 A * | 2/2000 | Dunn | H01L 21/67075 285/139.1 |
| 6,085,785 A * | 7/2000 | Smith, III | E21B 33/038 137/614.04 |
| 6,186,168 B1 * | 2/2001 | Schultz | G05D 16/109 137/505.11 |
| 6,386,545 B1 * | 5/2002 | Evans | F16J 13/02 277/336 |
| 6,578,881 B2 * | 6/2003 | Lynn | C23C 14/3407 285/354 |
| 7,021,677 B2 * | 4/2006 | Smith, III | E21B 33/00 285/379 |
| 7,730,905 B2 * | 6/2010 | Suzuki | F17C 13/04 137/613 |
| 8,539,976 B1 * | 9/2013 | Rodgers, Jr | F16K 15/066 137/512 |
| 9,568,114 B2 * | 2/2017 | Shima | F16K 27/02 |
| 9,822,884 B2 * | 11/2017 | Miyake | F16K 29/00 |
| 9,927,817 B2 * | 3/2018 | Nakamura | G05D 7/00 |
| 9,995,406 B2 * | 6/2018 | Kuroyanagi | F17C 13/04 |
| 10,072,776 B2 * | 9/2018 | Kocourek | F16L 19/0218 |
| 10,428,962 B2 * | 10/2019 | Suzuki | F16K 15/063 |
| 2006/0005885 A1 * | 1/2006 | Aardema | F16K 15/026 137/513 |
| 2010/0230624 A1 * | 9/2010 | Tejamo | F16K 27/067 251/315.16 |
| 2012/0006828 A1 * | 1/2012 | Frenal | F17C 13/04 220/581 |
| 2013/0106103 A1 * | 5/2013 | Horsfall | F16L 19/103 285/341 |
| 2013/0147189 A1 * | 6/2013 | Horsfall | F16L 19/046 285/353 |
| 2015/0034195 A1 | 2/2015 | Shima et al. | |
| 2016/0116918 A1 | 4/2016 | Nakamura et al. | |

FOREIGN PATENT DOCUMENTS

| | | |
|---|---|---|
| JP | 2013-029161 A | 2/2013 |
| JP | 2015-031348 A | 2/2015 |
| JP | 2016-84904 A | 5/2016 |

OTHER PUBLICATIONS

Aug. 2, 2019 Extended European Search Report issued in European Patent Application No. 19170281.0.
Apr. 8, 2022 Office Action issued in Chinese Application No. 201910317632.3.
Mar. 1, 2022 Office Action issued in Japanese Patent Application No. 2018-081522.

* cited by examiner

VALVE DEVICE

INCORPORATION BY REFERENCE

The disclosure of Japanese Patent Application No. 2018-081522 filed on Apr. 20, 2018 including the specification, drawings and abstract is incorporated herein by reference in its entirety.

BACKGROUND

1. Technical Field

The disclosure relates to a valve device.

2. Description of Related Art

A gas tank that is mounted in a fuel cell-powered vehicle or the like is provided with a valve device for controlling the flow of high-pressure hydrogen gas stored inside the gas tank (see Japanese Patent Application Publication No. 2015-031348 (JP 2015-031348 A)). As shown in FIG. 7, a valve device 100 as described above is equipped with a body 101 that is provided with a gas flow passage that establishes communication between an interior and an exterior of a gas tank, and a check valve 102 that controls the flow of hydrogen gas flowing to the gas flow passage. A pipeline 104 that extends from a piece of external equipment such as a supply source of hydrogen gas or the like via a joint 103 attached to the body 101 is connected to the gas flow passage.

The body 101 is provided with a first attachment hole 105 to which the joint 103 is attached, a second attachment hole 106 that opens to a bottom surface of the first attachment hole 105, an enlarged diameter portion 109 that opens to a bottom surface of the second attachment hole 106, a valve accommodation portion 110 that opens to a bottom surface of the enlarged diameter portion 109, and a filling passage 108 as a gas flow passage that opens to a bottom surface of the valve accommodation portion 110. An internal thread 107 is provided in an inner peripheral surface of the second attachment hole 106.

The enlarged diameter portion 109 and the valve accommodation portion 110 are provided with a check valve 102 that restrains hydrogen gas from flowing backward from the filling passage 108 to the joint side. The cheek valve 102 is equipped with a valve seat 111 that is provided with a valve hole 112 at a center thereof and that is accommodated in the enlarged diameter portion 109, a valving element 113 that opens/closes the valve hole 112 by moving onto/away from the valve seat 111 and that is accommodated in the valve accommodation portion 110, and an urging member 114 that urges the valving element 113 toward the valve seat 111. A valve seat fixation member 115 having an external thread 116 that is screwed to the internal thread 107 of the second attachment hole 106 and a communication hole 122 that communicates with the valve hole 112 of the valve seat 111 is screwed to the second attachment hole 106. The valve seat fixation member 115 brings the valve seat 111 into close contact with a step portion 118 between the enlarged diameter portion 109 and the valve accommodation portion 110, by pressing the valve seat 111 toward the step portion 118. Therefore, air tightness is maintained between the body 101 and the valve seat fixation member 115. A sealing member 121 is provided in a compressed state between a tip portion 119 of the joint 103 and a step portion 120 between the first attachment hole 105 and the second attachment hole 106.

Therefore, the sealing member 121 is in close contact with the joint 103 and the body 101, and air tightness is maintained between the joint 103 and the body 101.

SUMMARY

The sealing member 121 is provided to maintain air tightness between the joint 103 and the body 101 as described previously, and is not configured to maintain air tightness between the joint 103 and the valve seat fixation member 115. That is, there is substantially a gap between the sealing member 121 and the valve seat fixation member 115.

Therefore, in the above-mentioned valve device 100, when high-pressure hydrogen gas is supplied to the filling passage 108 through the pipeline 104 for the piece of external equipment and the joint 103, this high-pressure hydrogen gas enters a screwed region 117 of the external thread 116 of the valve seat fixation member 115 and the internal thread 107 of the second attachment hole 106 from between the sealing member 121 and the valve seat fixation member 115, and may accumulate in the screwed region 117. Therefore, a stress is applied to the external thread 116 of the valve seat fixation member 115 and the internal thread 107 of the second attachment hole 106.

Besides, when hydrogen gas is stopped from being supplied from the pipeline 104 for the piece of external equipment, the pressure inside the joint 103 may become lower than the pressure in the screwed region 117. Therefore, the high-pressure hydrogen gas that has accumulated in the screwed region 117 is returned into the joint 103 from between the sealing member 121 and the valve seat fixation member 115. Furthermore, when high-pressure hydrogen gas is supplied again to the filling passage 108 through the pipeline 104 for the piece of external equipment and the joint 103, this high-pressure hydrogen gas accumulates again in the screwed region 117 due to the above-mentioned mechanism, and a stress is applied again to the external thread 116 of the valve seat fixation member 115 and the internal thread 107 of the second attachment hole 106. That is, a stress is repeatedly applied to the screwed region 117. Therefore, the fatigue strength of the screwed region 117 and a surrounding area thereof may be influenced.

The disclosure provides a valve device that is equipped with a sealing structure that can restrain gas flowing in the device from influencing the strength of the device.

A valve device according to an aspect of the disclosure includes a body having a gas flow passage that establishes communication between an interior and an exterior of a gas tank in which high-pressure gas is stored, a joint that is attached to the body and that connects a pipeline to the gas flow passage, a check valve that restrains the gas inside the gas tank from flowing backward from the gas flow passage toward the joint and that is equipped with a valve seat having a valve hole and a valving element for opening/closing the valve hole, a valve seat fixation member that fixes the valve seat to the body, that has a communication hole communicating with the valve hole, and that has an outer peripheral surface on which an external thread is provided, and a sealing member. The body has an attachment hole that attaches the joint and the valve seat fixation member from an outside of the body in a sequence of the joint and the valve seat fixation member, and that has an inner peripheral surface in which an internal thread screwed to the external thread of the valve seat fixation member is provided. The sealing member, which maintains air tightness between the joint and the valve seat fixation member, is provided in a compressed state between the joint and the valve seat fixation member. An outer peripheral edge of the sealing member is located radially inward of a screwed region of the internal thread and the external thread.

According to this aspect, the region of the sealing member that is compressed by the joint and the valve seat fixation member is located radially inward of the screwed region of the internal thread and the external thread (on the inner peripheral surface side of the communication hole of the valve seat fixation member). Therefore, when gas is supplied from the joint toward the gas flow passage, the supplied gas is blocked by the sealing member that is compressed between the joint and the valve seat fixation member, before reaching the screwed region of the internal thread and the external thread. Accordingly, the gas can be restrained from reaching the screwed region of the valve seat fixation member and the body. Thus, a stress can be restrained from being applied to the screwed region, and can hence be restrained from influencing the strength of the device.

In the aforementioned aspect, the joint may have, at a tip portion of the joint that faces the valve seat fixation member, a sealing member accommodation portion that accommodates the sealing member, and the sealing member may be compressed between the joint and the valve seat fixation member, with the tip portion abutting on an end surface of the valve seat fixation member that the tip portion faces.

According to this configuration, the joint can be attached to the attachment hole of the body with the sealing member accommodated in the sealing member accommodation portion of the joint. Therefore, the sealing member can be positioned between the joint and the valve seat fixation member, and the assemblability of the sealing member is improved.

Besides, in the case where the joint is attached to the attachment hole of the body with the sealing member accommodated in the sealing member accommodation portion, when the tip portion of the joint does not abut on the end surface of the valve seat fixation member, the compressed sealing member may enter a space between the tip portion of the joint and the end surface of the valve seat fixation member. Consequently, the sealing function of the sealing member deteriorates. In this respect, according to this configuration, the sealing member can be restrained from entering the space between the tip portion of the joint and the end surface of the valve seat fixation member. Therefore, the sealing member can keep its ability to maintain air tightness between the joint and the valve seat fixation member.

Besides, gas can be more effectively restrained from reaching the screwed region of the internal thread and the external thread, between the tip portion of the joint and the end surface of the valve seat fixation member as well. It is assumed herein that an impact is applied to the joint from the outside of the valve device. In this case, when the impact is applied in a certain direction, the joint may separate from the attachment hole by inclining with respect to an axis of the joint. In the basic configuration, no tapered surface is provided on an outer peripheral edge of the tip portion of the joint. However, when this configuration is adopted, a region of the outer peripheral edge of the tip portion of the joint gets hooked in such a manner as to cut into an inner peripheral surface of the attachment hole. Therefore, the joint is about to separate from the attachment hole of the body in such a manner as to rotate with the region of the tip portion of the joint that is hooked on the inner peripheral surface of the attachment hole serving as a fulcrum. Consequently, a load is applied from the tip portion of the joint to a position of the valve seat fixation member that is biased from the axis of the joint, and a stress is applied to the screwed region of the internal thread and the external thread.

In the aforementioned aspect, the tip portion of the joint that faces the valve seat fixation member may be formed in a shape of a cylinder, and the joint may have, on an outer periphery of the tip portion, a tapered surface that is formed such that an outer diameter of the tip portion gradually decreases as a distance to the valve seat fixation member shortens.

According to this configuration, when the joint separates from the attachment hole of the body in such a manner as to incline with respect to the axis of the joint, the tapered surface of the tip portion of the joint makes it likely to stop the tip portion of the joint from being hooked on the inner peripheral surface of the attachment hole of the body. Consequently, the load is also likely to be stopped from being applied from the tip portion of the joint to the valve seat fixation member. Therefore, the joint can be separated from the attachment hole while reducing the stress applied to the screwed region of the internal thread and the external thread, in comparison with the configuration in which no tapered surface is provided on the tip portion of the joint.

In the aforementioned aspect, the joint may have a throttle valve mechanism, the joint may have, on an axis of the communication hole inside the joint, a throttle valve mechanism accommodation hole in which the throttle valve mechanism is accommodated, the throttle valve mechanism may include a columnar flow passage formation member that is provided with a communication passage communicating with the communication hole and that forms a gas flow passage communicating with the communication passage by being accommodated with a gap from an inner peripheral surface of the throttle valve mechanism accommodation hole, a cylindrical filter portion that picks up foreign matter between the communication passage and the gap may be provided in such a manner as to surround the columnar flow passage formation member, the cylindrical filter portion may have a cylindrical filter, an annular gasket that restrains foreign matter from entering the communication passage from between the annular gasket and both end portions of the cylindrical filter by being arranged in such a manner as to sandwich both the end portions of the cylindrical filter, and an annular fixation member that is fitted to the columnar flow passage formation member with the annular gasket compressed between the annular fixation member and both the end portions of the cylindrical filter, and the annular fixation member may abut on the sealing member.

In the case where there is adopted a configuration in which the fixation member does not abut on the sealing member, when high-pressure gas flows into the gap between the inner peripheral surface of the throttle valve mechanism accommodation hole of the joint and the outer peripheral surface of the flow passage formation member via the throttle valve mechanism, the fixation member may be offset in position toward the valve seat fixation member side due to this high-pressure gas. That is, the compression of the gasket provided at both the end portions of the filter weakens, and foreign matter enters the communication passage from between both the end portions of the filter and the gasket. Consequently, this foreign matter enters the gas flow passage side of the body via the communication passage of the flow passage formation member, gets stuck between the valving element and the valve seat, and influences the function of the check valve.

In that respect, according to this configuration, the fixation member can be restrained from being offset in position toward the valve seat fixation member side due to the high-pressure gas flowing via the throttle valve mechanism. Accordingly, the function of the check valve can be maintained while maintaining the function of the filter portion inside the joint.

The valve device according to the disclosure can restrain gas from flowing to the screwed region of the valve seat fixation member and the body.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
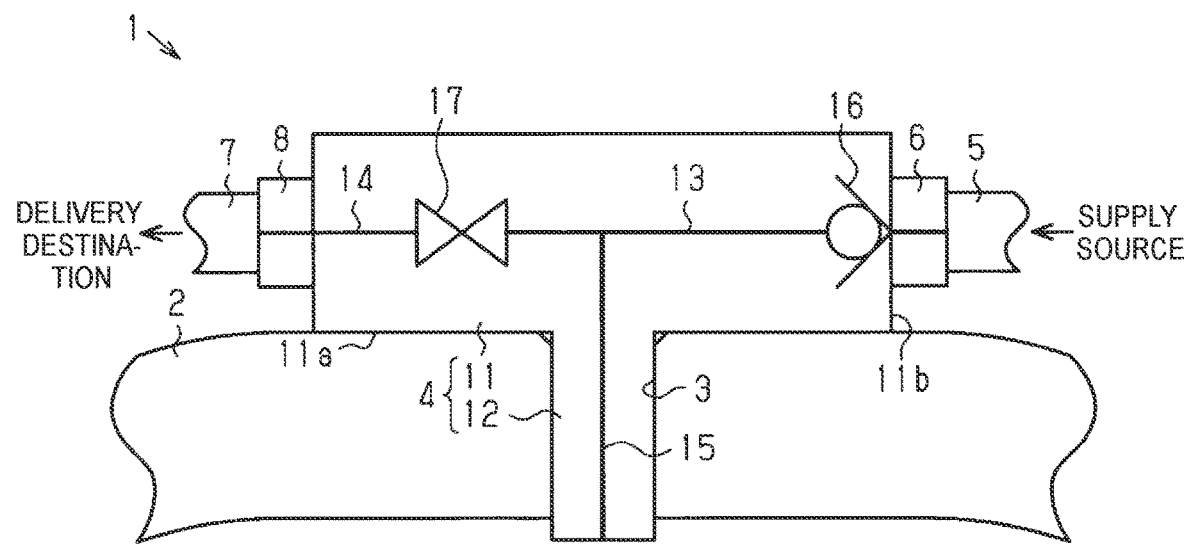
FIG. 1 is a schematic configuration view of a valve device.

A valve device 1 according to one embodiment will be described hereinafter. As shown in FIG. 1, the valve device 1 is attached to an attachment port 3 of a gas tank 2 in which high-pressure (e.g., 70 MPa) hydrogen gas is stored. The valve device 1 is equipped with a body 4 made of aluminum alloy, a supply-side joint 6 that is attached to the body 4 to connect a supply pipeline 5 extending from a supply source of hydrogen gas, and a delivery-side joint 8 for connecting a delivery pipeline 7 that extends to a delivery destination such as a fuel cell or the like. The body 4 has a box-shaped main body portion 11 that is arranged outside the gas tank 2, and an attachment portion 12 that is inserted into the attachment port 3. The attachment portion 12 extends in a direction perpendicular to a bottom surface 11a of the main body portion 11 (downward in FIG. 1). The attachment portion 12 is formed in the shape of a column.

The main body portion 11 is provided with a filling passage 13 for filling an interior of the gas tank 2 with hydrogen gas flowing in from the supply pipeline 5, and a delivery passage 14 for delivering hydrogen gas to a delivery destination such as a fuel cell or the like via the delivery pipeline 7. The attachment portion 12 is provided with a connection passage 15 that is connected to the filling passage 13 and the delivery passage 14 and that opens into the gas tank 2. In the present embodiment, the filling passage 13 and the connection passage 15 constitute a gas flow passage that establishes communication between the interior and an exterior of the gas tank 2. A cheek valve 16 that restrains the hydrogen gas with which the interior of the gas tank 2 is filled from flowing backward from the gas flow passage toward the supply-side joint 6 is provided between the filling passage 13 and the supply-side joint 6. The delivery passage 14 is provided with an electromagnetic valve 17 that controls the supply of hydrogen gas to the delivery destination. Moreover, in the valve device 1, the supply pipeline 5 is connected to the filling passage 13 and the connection passage 15 by coupling the supply pipeline 5 to the supply-side joint 6, and the delivery pipeline 7 is connected to the delivery passage 14 by coupling the delivery pipeline 7 to the delivery-side joint 8. Incidentally, the supply-side joint 6 is an exemplary joint for connecting the supply pipeline 5 to the gas flow passage.

Figure 2:
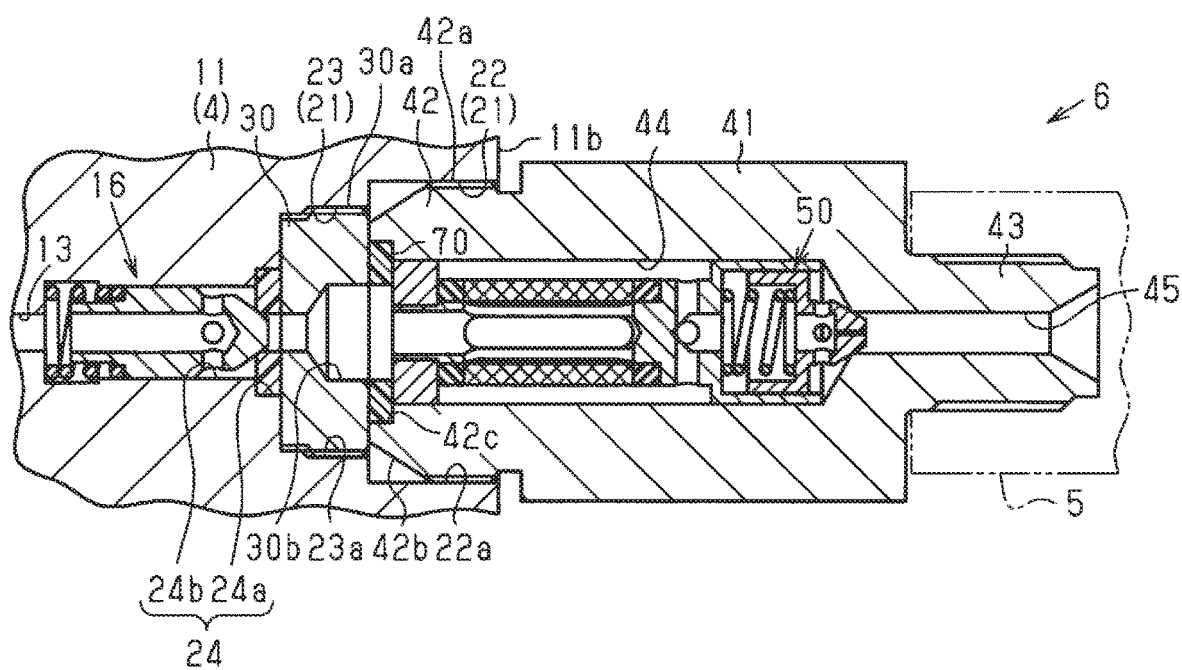
FIG. 2 is a cross-sectional view showing a coupled region of a body and a supply-side joint in the valve device.

Next, the configuration of the vicinity of a coupled region of the body 4 and the supply-side joint 6 will be described. As shown in FIG. 2, the main body portion 11 is provided with the attachment hole 21. The attachment hole 21 extends in a direction perpendicular to a lateral surface 11b of the main body portion 11. The attachment hole 21 has a first attachment hole 22 that opens to the lateral surface 11b, and a second attachment hole 23 that opens to a bottom surface of the first attachment hole 22. That is, the first attachment hole 22 and the second attachment hole 23 are provided in this sequence from an outside of the body 4. The first attachment hole 22 and the second attachment hole 23 are provided coaxially with each other. An internal thread 22a is provided in an inner peripheral surface of the first attachment hole 22, on an opening portion side of the lateral surface 11b. An internal thread 23a is provided in an inner peripheral surface of the second attachment hole 23. A cylindrical valve seat fixation member 30 is attached to the second attachment hole 23. An external thread 30a is provided on an outer peripheral surface of the valve seat fixation member 30. The external thread 30a of the valve seat fixation member 30 is screwed to the internal thread 23a of the second attachment hole 23. Besides, a communication hole 30b that penetrates in a thickness direction is provided through a central portion of the valve seat fixation member 30. The communication hole 30b is provided coaxially with the attachment hole 21. Besides, the main body portion 11 is provided with a check valve accommodation hole 24 that opens to a bottom surface of the second attachment hole 23 and that communicates with the filling passage 13. The check valve accommodation hole 24 is provided coaxially with the attachment hole 21. The check valve 16 is accommodated in the check valve accommodation hole 24.

The supply-side joint 6 has a cylindrical grip portion 41 that is gripped by a tool or the like, a cylindrical tip portion 42 that is extended from the grip portion 41 toward the body 4 side, and a pipeline-side coupling portion 43 that is extended from the grip portion 41 to the opposite side of the body (the right side in FIG. 2). The grip portion 41, the tip portion 42, and the pipeline-side coupling portion 43 are provided coaxially with one another. The tip portion 42 is attached to the first attachment hole 22 of the body 4, and faces the valve seat fixation member 30. An external thread 42a is provided on an outer peripheral surface of the tip portion 42 on the grip portion 41 side. The external thread 42a of the tip portion 42 is screwed to the internal thread 22a of the first attachment hole 22. A tapered surface 42b is provided on an outer periphery of the tip portion 42 on the opposite side of the grip portion 41 with respect to the external thread 42a. The tapered surface 42b is provided such that the outer diameter of the tip portion 42 gradually decreases as the distance to the valve seat fixation member 30 shortens. Incidentally, the lengths of the internal thread 22a of the first attachment hole 22 and the external thread 42a of the tip portion 42 along an axis of the supply-side joint 6 are set as short as possible such that the supply-side joint 6 is likely to separate from the first attachment hole 22 when a predetermined impact load is applied to the supply-side joint 6.

A throttle valve mechanism accommodation hole 44 that is provided on an axis of the communication hole 30*b* of the valve seat fixation member 30 is provided inside the tip portion 42 and the grip portion 41. A supply passage 45 that is provided coaxially with the throttle valve mechanism accommodation hole 44 is provided inside the pipeline-side coupling portion 43. The throttle valve mechanism accommodation hole 44 and the supply passage 45 communicate with each other. The inner diameter of the supply passage 45 is smaller than the inner diameter of the throttle valve mechanism accommodation hole 44. A throttle valve mechanism 50 is accommodated in the throttle valve mechanism accommodation hole 44.

Figure 3:
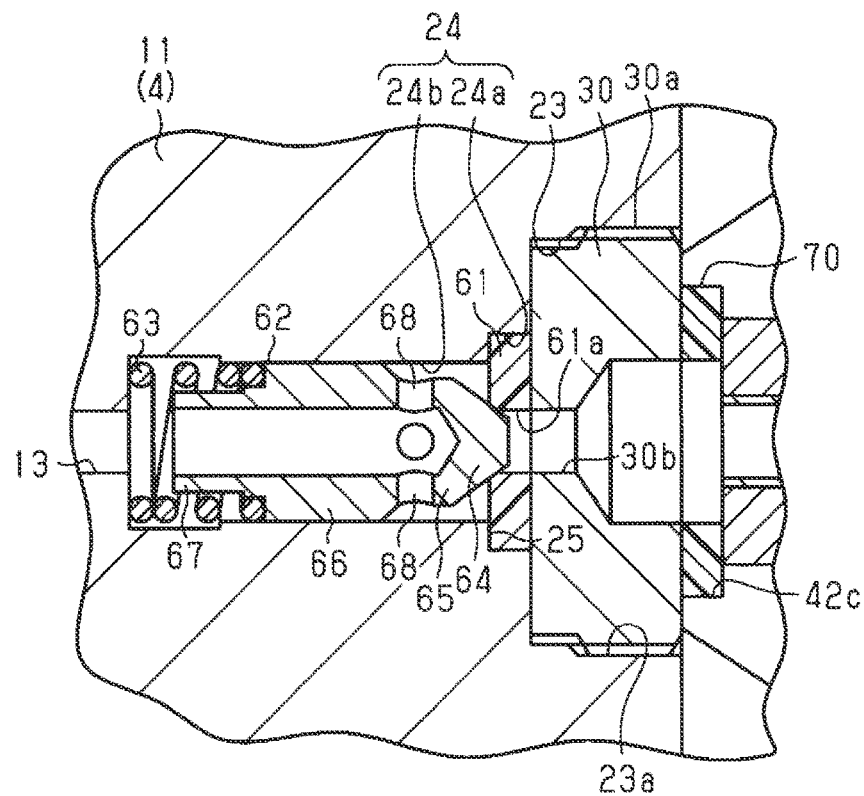
FIG. 3 is a cross-sectional view of the periphery of a check valve of the valve device.

Next, the configuration of the periphery of the check valve 16 will be described. As shown in FIG. 3, the check valve accommodation hole 24 of the main body portion 11 has an enlarged diameter portion 24*a* that opens to the bottom surface of the second attachment hole 23, and a valve accommodation portion 24*b* that opens to a bottom surface of the enlarged diameter portion 24*a* and that communicates with the filling passage 13 on a bottom surface of the check valve accommodation hole 24.

The check valve 16 is equipped with a valve seat 61 that is accommodated in the enlarged diameter portion 24*a*, a valving element 62 that is accommodated in the valve accommodation portion 24*b*, and a coil spring 63 that urges the valving element 62 toward the valve seat 61 side. The valve seat 61 has a valve hole 61*a* that communicates with the communication hole 30*b* of the valve seat fixation member 30. The valve seat 61 is pressed against a step surface 25 between the enlarged diameter portion 24*a* and the valve accommodation portion 24*b*, by screwing the valve seat fixation member 30 to the second attachment hole 23. Therefore, the valve seat 61 is fixed to the body 4 by the valve seat fixation member 30. Besides, the valve seat 61 maintains air tightness between the body 4 and the valve seat fixation member 30, by being pressed against the step surface 25 by the valve seat fixation member 30. The valving element 62 is provided with a closure portion 64, a small-diameter cylinder portion 65, a large-diameter cylinder portion 66, and a support portion 67 in this sequence from the valve seat 61 side. The closure portion 64 is formed in such a manner as to be tapered as the distance from the small-diameter cylinder portion 65 lengthens. Each of the small-diameter cylinder portion 65, the large-diameter cylinder portion 66, and the support portion 67 is formed in the shape of a cylinder. A tip end of the closure portion 64 opens/closes the valve hole 61*a*. That is, the gas flow passage, namely, the filling passage 13 is opened/closed through the moving of the valving element 62 onto/away from the valve seat 61. The small-diameter cylinder portion 65 is provided with a plurality of side holes 68 that penetrate an interior and an exterior of the small-diameter cylinder portion 65. An outer peripheral surface of the large-diameter cylinder portion 66 is in sliding contact with an inner peripheral surface of the valve accommodation portion 24*b*. The outer diameter of the support portion 67 is slightly smaller than the outer diameter of the large-diameter cylinder portion 66. The coil spring 63 abuts at one end portion thereof on the valve seat 61 side on a step portion between the large-diameter cylinder portion 66 of the valving element 62 and the support portion 67, and abuts at the other end portion thereof on the filling passage 13 side on a bottom surface of the valve accommodation portion 24*b*. The coil spring 63 urges the valving element 62 toward the valve seat 61. The closure portion 64 of the valving element 62 closes the valve hole 61*a* of the valve seat 61, through the use of an urging force of the coil spring 63.

Figure 4:
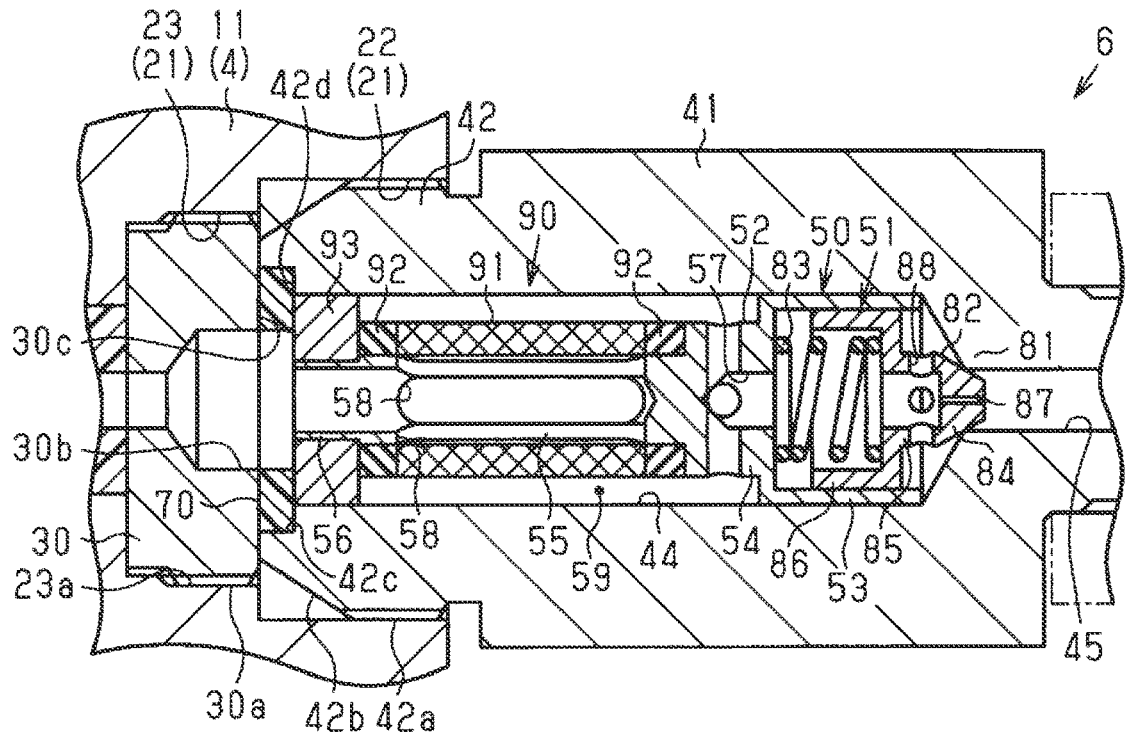
FIG. 4 is a cross-sectional view of the periphery of a tip portion of the supply-side joint of the valve device.

Next, the configuration of the periphery of the tip portion 42 of the supply-side joint 6 will be described. As shown in FIG. 4, a sealing member accommodation portion 42*c* in the shape of a bottomed cylinder is provided continuously to the throttle valve mechanism accommodation hole 44, inside the tip portion 42. The inner diameter of the sealing member accommodation portion 42*c* is larger than the inner diameter of the throttle valve mechanism accommodation hole 44, and is smaller than the outer diameter of the valve seat fixation member 30. An annular sealing member 70 is accommodated inside the sealing member accommodation portion 42*c*. The thickness of the sealing member 70 is set slightly larger than the depth (the axial length) of the sealing member accommodation portion 42*c*. The sealing member 70 maintains air tightness between the supply-side joint 6 and the valve seat fixation member 30, by being compressed between an end surface 30*c* of the valve seat fixation member 30 that faces the tip portion 42 and the bottom surface 42*d* of the sealing member accommodation portion 42*c* of the tip portion 42. More specifically, an outer peripheral edge of the sealing member 70 is located on the inner peripheral surface side of the communication hole 30*b* of the valve seat fixation member 30 with respect to the screwed region of the internal thread 23*a* of the second attachment hole 23 and the external thread 30*a* of the valve seat fixation member 30. Therefore, the compressed region of the sealing member 70 is located radially inward (on the inner peripheral surface side of the communication hole 30*b*) of the screwed region. It should be noted herein that an advancement end of the tip portion 42 of the supply-side joint 6 is defined by the end surface 30*c* of the valve seat fixation member 30. That is, when screwed to the first attachment hole 22, the tip portion 42 abuts on the end surface 30*c* of the valve seat fixation member 30. Therefore, the sealing member 70 is compressed between the supply-side joint 6 and the valve seat fixation member 30 while being screwed to the first attachment hole 22, until the tip portion 42 abuts on the end surface 30*c* of the valve seat fixation member 30. Incidentally, the advancement end indicates a position of an end portion of the tip portion 42 that faces the valve seat fixation member 30 at the time when the tip portion 42 becomes incapable of advancing any further toward the bottom surface side of the first attachment hole 22 in the case where the tip portion 42 is screwed to the first attachment hole 22.

The throttle valve mechanism 50 has a throttle valve 51, and a columnar flow passage formation member 52 that supports the throttle valve 51 inside the throttle valve mechanism accommodation hole 44. The flow passage formation member 52 is provided with a valve chamber formation portion 53, a columnar portion 54, a tubular portion 55, and a fitting portion 56 in this sequence from the pipeline-side coupling portion 43 side. The valve chamber formation portion 53 is formed in the shape of a cylinder. The valve chamber formation portion 53 is fitted in the throttle valve mechanism accommodation hole 44. The columnar portion 54 is formed in the shape of a column. The outer diameter of the columnar portion 54 is smaller than the outer diameter of the valve chamber formation portion 53. Besides, a flow passage 57 that penetrates in a radial direction that is perpendicular to an axis of the throttle valve mechanism accommodation hole 44 and that opens into the valve chamber formation portion 53 is formed through the columnar portion 54. The tubular portion 55 is formed in the shape of a cylinder. The outer diameter of the tubular portion 55 is smaller than the outer diameter of the columnar portion 54. Besides, the tubular portion 55 is provided with a plurality of communication passages 58 that penetrate an interior and an exterior of the tubular portion 55. The communication passages 58 communicate with the communication hole 30b of the valve seat fixation member 30. The fitting portion 56 is formed in the shape of a cylinder. The outer diameter of the fitting portion 56 is slightly smaller than the outer diameter of the tubular portion 55. Incidentally, a gap 59 is formed between outer peripheral surfaces of the columnar portion 54 and the tubular portion 55 and an inner peripheral surface of the throttle valve mechanism accommodation hole 44. The gap 59 communicates with the communication passages 58. Therefore, the gap 59 functions as a gas flow passage.

The throttle valve 51 is equipped with a valving element 82 that moves onto/away from a valve seat 81 as a boundary region between the throttle valve mechanism accommodation hole 44 and the supply passage 45, and a coil spring 83 that urges the valving element 82 toward the valve seat 81 side. The valving element 82 is provided with a valve portion 84, a cylindrical portion 85, and an accommodation cylindrical portion 86 in this sequence from the valve seat 81 side. The valve portion 84 is formed in such a manner as to be tapered as the distance from the cylindrical portion 85 lengthens. Moreover, the valve portion 84 is provided with a minute micropore 87 that opens into a center of a tip portion of the valve portion 84 and the cylindrical portion 85. The cylindrical portion 85 is formed in the shape of a cylinder. Besides, the cylindrical portion 85 is provided with a plurality of side holes 88 that penetrate an interior and an exterior of the cylindrical portion 85. The accommodation cylindrical portion 86 is formed in the shape of a cylinder. An outer peripheral surface of the accommodation cylindrical portion 86 is in sliding contact with an inner peripheral surface of the valve chamber formation portion 53. The inner diameter of the accommodation cylindrical portion 86 is larger than the outer diameter of the cylindrical portion 85.

The coil spring 83 abuts at one end portion thereof on the valve seat 81 side on a bottom portion of the accommodation cylindrical portion 86 of the valving element 82, and abuts at the other end portion thereof on a bottom portion side of the valve chamber formation portion 53 on a bottom surface of the valve chamber formation portion 53. The coil spring 83 urges the valving element 82 toward the valve seat 81. The valve portion 84 of the valving element 82 closes the supply passage 45, through the use of an urging force of the coil spring 83.

Besides, a filter portion 90 is provided in such a manner as to surround the tubular portion 55 of the flow passage formation member 52. The filter portion 90 has the function of picking up the foreign matter contained in hydrogen gas flowing from the gap 59 to the communication passages 58.

The filter portion 90 is equipped with a cylindrical filter 91, annular gaskets 92 that are arranged in such a manner as to sandwich both end portions of the filter 91, and an annular fixation member 93 that compresses the gaskets 92 at both the end portions of the filter 91 respectively. The filter 91 is provided at a position corresponding to the communication passages 58 and the gap 59 in a radial direction that is perpendicular to an axis of the flow passage formation member 52. One of the gaskets 92 is provided between one end portion of the filter 91 and a step portion between the columnar portion 54 and the tubular portion 55. The other gasket 92 is provided between the other end portion of the filter 91 and the fixation member 93. The fitting portion 56 is fitted to the fixation member 93 with the gaskets 92 compressed along the axis of the flow passage formation member 52. Therefore, the filter 91 and the gaskets 92 are in close contact with each other, and restrain foreign matter from entering the tubular portion 55 from between the filter 91 and the gaskets 92. Besides, the fixation member 93 abuts on the sealing member 70.

Next, the operation of the valve device 1 will be described. In the case where the gas tank 2 is filled with hydrogen gas, the supply pipeline 5 is connected to the supply-side joint 6 to deliver hydrogen gas. At this time, the valving element 82 of the throttle valve 51 moves toward the body 4 side against the urging force of the coil spring 83, and moves away from the valve seat 81, due to a pressure of hydrogen gas. Thus, a large amount of hydrogen gas flows into the valve chamber formation portion 53 of the flow passage formation member 52 via the supply passage 45. The hydrogen gas that has flowed into the valve chamber formation portion 53 flows into the check valve accommodation hole 24 side via the side holes 88 formed through the valving element 82, the flow passage 57 formed in the columnar portion 54 of the flow passage formation member 52, the gap 59, the filter 91, the communication passages 58 of the tubular portion 55, and the communication hole 30b of the valve seat fixation member 30. Then, the valving element 62 of the check valve 16 moves toward the filling passage 13 side against the urging force of the coil spring 63, and moves away from the valve seat 61, due to a pressure of hydrogen gas. Thus, hydrogen gas flows into the valve accommodation portion 24b, and the interior of the gas tank 2 is filled with hydrogen gas from the side holes 68 of the valving element 62 through an interior of the valving element 62.

On the other hand, in the case where the gas tank 2 is not filled with hydrogen gas, the valving element 62 moves onto the valve seat 61 after being urged toward the valve seat 61 side due to the pressure of hydrogen gas in the gas tank 2 (the filling passage 13) and the urging force of the coil spring 63. Thus, the valve hole 61a of the valve seat 61 closes, and the hydrogen gas inside the gas tank 2 is restrained from flowing backward toward the supply-side joint 6 side. Besides, the valving element 82 moves onto the valve seat 81 due to the urging force of the coil spring 83. Incidentally, the micropore 87 is formed through the valving element 82. Therefore, even when the valving element 82 is on the valve seat 81, the flow of hydrogen gas is not completely blocked, and the valving element 82 functions as an overflow preventing valve that allows a small amount of hydrogen gas to flow from the throttle valve mechanism accommodation hole 44 to the supply passage 45. Therefore, for example, when the valving element 62 is damaged etc., a small amount of hydrogen gas is discharged to the outside of the body 4 via the throttle valve 51, which allows an operator to detect an abnormality in the valve device 1 (the check valve 16).

The operation and effect of the present embodiment will be described. (1) The region that is compressed by the supply-side joint 6 of the sealing member 70 and the valve seat fixation member 30 is located radially inward of the screwed region of the internal thread 23a of the second attachment hole 23 and the external thread 30a of the valve seat fixation member 30, namely, on the inner peripheral surface side of the communication hole 30b of the valve seat fixation member 30. Therefore, when hydrogen gas is supplied from the supply-side joint 6 toward the filling passage 13 and the connection passage 15, the supplied hydrogen gas is blocked by the sealing member 70 that is compressed between the supply-side joint 6 and the valve seat fixation member 30, before reaching the screwed region of the internal thread 23a and the external thread 30a. Accordingly, hydrogen gas can be restrained from reaching the screwed region of the valve seat fixation member 30 and the body 4. Thus, a stress can be restrained from being applied to the screwed region of the valve seat fixation member 30 and the body 4, and this stress can hence be restrained from influencing the strength of the valve device 1.

Figure 7:
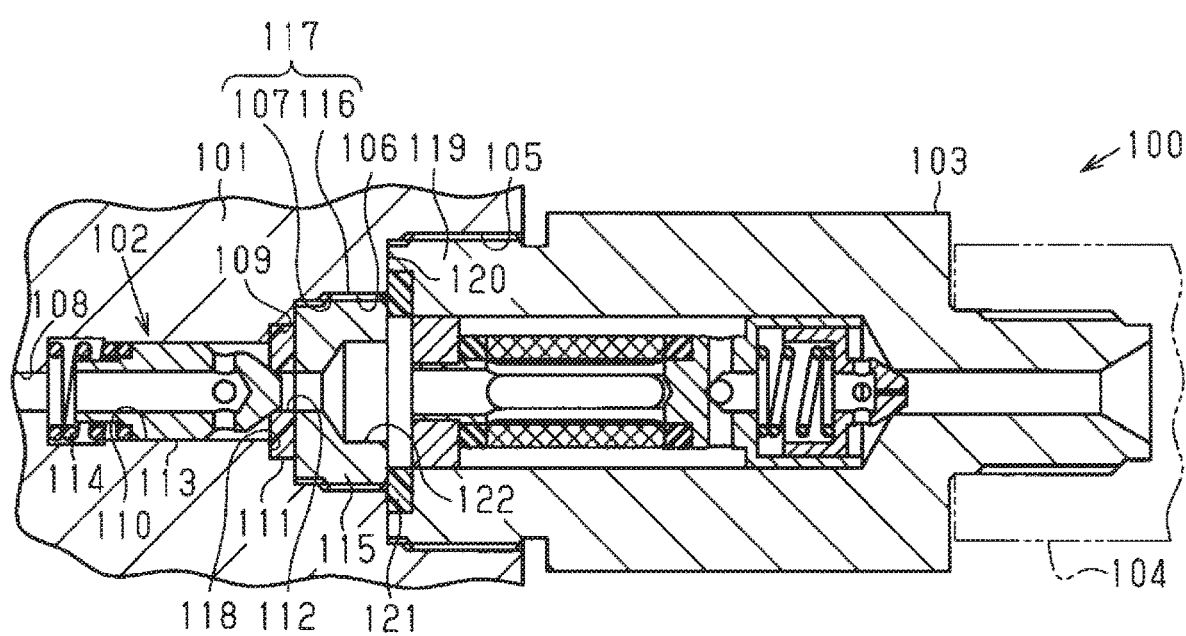
FIG. 7 is a cross-sectional view showing a coupled region of a conventional body and a conventional joint.

(2) Besides, in the conventional configuration shown in FIG. 7, when the high-pressure hydrogen gas that has accumulated in the screwed region 117 of the external thread 116 of the valve seat fixation member 115 and the internal thread 107 of the second attachment hole 106 is returned from between the sealing member 121 and the valve seat fixation member 115 into the joint 103, outgassing noise may be produced. In this respect according to the present embodiment, hydrogen gas is blocked by the sealing member 70 that is compressed between the supply-side joint 6 and the valve seat fixation member 30, before reaching the screwed region of the internal thread 23a and the external thread 30a, so outgassing noise can be restrained from being produced.

(3) The supply-side joint 6 can be attached to the first attachment hole 22 of the body 4 with the sealing member 70 accommodated in the sealing member accommodation portion 42c of the supply-side joint 6. Therefore, the sealing member 70 can be positioned between the supply-side joint 6 and the valve seat fixation member 30, and the assemblability of the sealing member 70 is improved.

(4) Besides, in the case where the supply-side joint 6 is attached to the first attachment hole 22 of the body 4 with the sealing member 70 accommodated in the sealing member accommodation portion 42c, when the tip portion 42 of the supply-side joint 6 does not abut on the end surface 30c of the valve seat fixation member 30, the compressed sealing member 70 may enter a space between the tip portion 42 of the supply-side joint 6 and the end surface 30c of the valve seat fixation member 30. Consequently, the sealing function of the sealing member 70 deteriorates. In this respect, the tip portion 42 of the supply-side joint 6 and the end surface 30c of the valve seat fixation member 30 abut on each other. Therefore, the sealing member 70 can be restrained from entering the space between the tip portion 42 of the supply-side joint 6 and the end surface 30c of the valve seat fixation member 30. Accordingly, the sealing member 70 can keep its ability to maintain air tightness between the supply-side joint 6 and the valve seat fixation member 30.

(5) Besides, hydrogen gas can be more effectively restrained from reaching the screwed region between the internal thread 23a of the second attachment hole 23 and the external thread 30a of the valve seat fixation member 30, between the tip portion 42 of the supply-side joint 6 and the end surface 30c of the valve seat fixation member 30 as well.

(6) It is assumed that an impact is applied to the supply-side joint 6 from an outside of the valve device 1. In this case, when the impact is applied in a certain direction, the supply-side joint 6 may separate from the first attachment hole 22 by inclining with respect to the axis of the supply-side joint 6. In the basic configuration, the tapered surface 42b is not provided on the outer periphery of the tip portion 42 of the supply-side joint 6. However, when this configuration is adopted, part of the outer periphery of the tip portion 42 of the supply-side joint 6 gets hooked in such a manner as to cut into the inner peripheral surface of the first attachment hole 22. Therefore, the supply-side joint 6 is about to separate from the first attachment hole 22 in such a manner as to rotate with the region of the tip portion 42 of the supply-side joint 6 that is hooked on the inner peripheral surface of the first attachment hole 22 serving as a fulcrum. Consequently, a load is applied from the tip portion 42 of the supply-side joint 6 to a position of the end surface 30c of the valve seat fixation member 30 that is biased from the axis of the supply-side joint 6, and a stress is applied to the screwed region of the internal thread 23a of the second attachment hole 23 and the external thread 30a of the valve seat fixation member 30.

Figure 5:
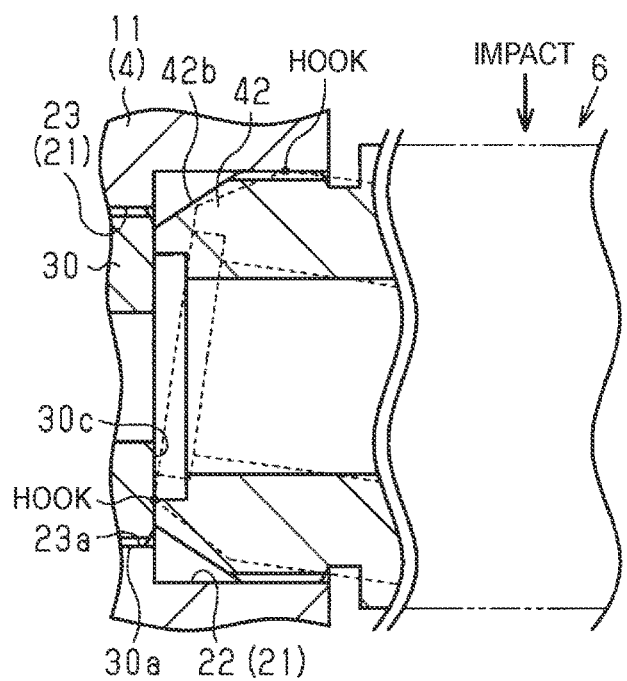
FIG. 5 is a schematic view showing how the supply-side joint is displaced when an impact is applied to the supply-side joint of the valve device.

In this respect, as shown in FIG. 5, when the supply-side joint 6 separates from the first attachment hole 22 of the body 4 in such a manner as to incline with respect to the axis of the supply-side joint 6, the tapered surface 42b of the tip portion 42 of the supply-side joint 6 makes it likely to stop the tip portion 42 of the supply-side joint 6 from being hooked on the inner peripheral surface of the first attachment hole 22. Consequently, the load is also likely to be stopped from being applied from the tip portion 42 of the supply-side joint 6 to the end surface 30c of the valve seat fixation member 30. Therefore, the supply-side joint 6 can be separated from the first attachment hole 22 while reducing the stress applied to the screwed region of the internal thread 23a of the second attachment hole 23 and the external thread 30a of the valve seat fixation member 30, in comparison with the configuration in which the tapered surface 42b is not provided on the tip portion 42 of the supply-side joint 6. Incidentally, for the convenience of explanation, only a positional relationship between the first attachment hole 22 and the tip portion 42 of the supply-side joint 6 is depicted in FIG. 5.

(7) In the case where there is adopted a configuration in which the fixation member 93 does not abut on the sealing member 70, when high-pressure hydrogen gas flows into the gap 59 between the inner peripheral surface of the throttle valve mechanism accommodation hole 44 of the supply-side joint 6 and an outer peripheral surface of the flow passage formation member 52 via the throttle valve mechanism 50, the fixation member 93 may be offset in position toward the valve seat fixation member 30 side due to the high-pressure hydrogen gas. That is, the compression of the gaskets 92 that are provided on both the end portions of the filter 91 respectively weakens, and foreign matter enters the communication passages 58 from between both the end portions of the filter 91 and the gaskets 92. Consequently, this foreign matter enters the filling passage 13 side of the body 4 via the communication passages 58 of the flow passage formation member 52, gets stuck between the valving element 62 and the valve seat 61, and influences the function of the check valve 16.

In this respect, the fixation member 93 abuts on the sealing member 70. Therefore, the fixation member 93 can be restrained from being offset in position toward the valve seat fixation member 30 side due to the high-pressure hydrogen gas flowing via the throttle valve mechanism 50. Accordingly, the function of the check valve 16 can be maintained while maintaining the function of the filter portion 90 inside the supply-side joint 6.

Incidentally, the present embodiment can be carried out after being changed as follows. The present embodiment and the following modification examples can be carried out in combination with one another within such a range that no technical contradiction is caused. In the present embodiment, the filter 91 of the filter portion 90 is provided at the position corresponding to the communication passages 58 and the gap 59 in the radial direction that is perpendicular to the axis of the throttle valve mechanism accommodation hole 44, but the disclosure is not limited thereto.

Figure 6:
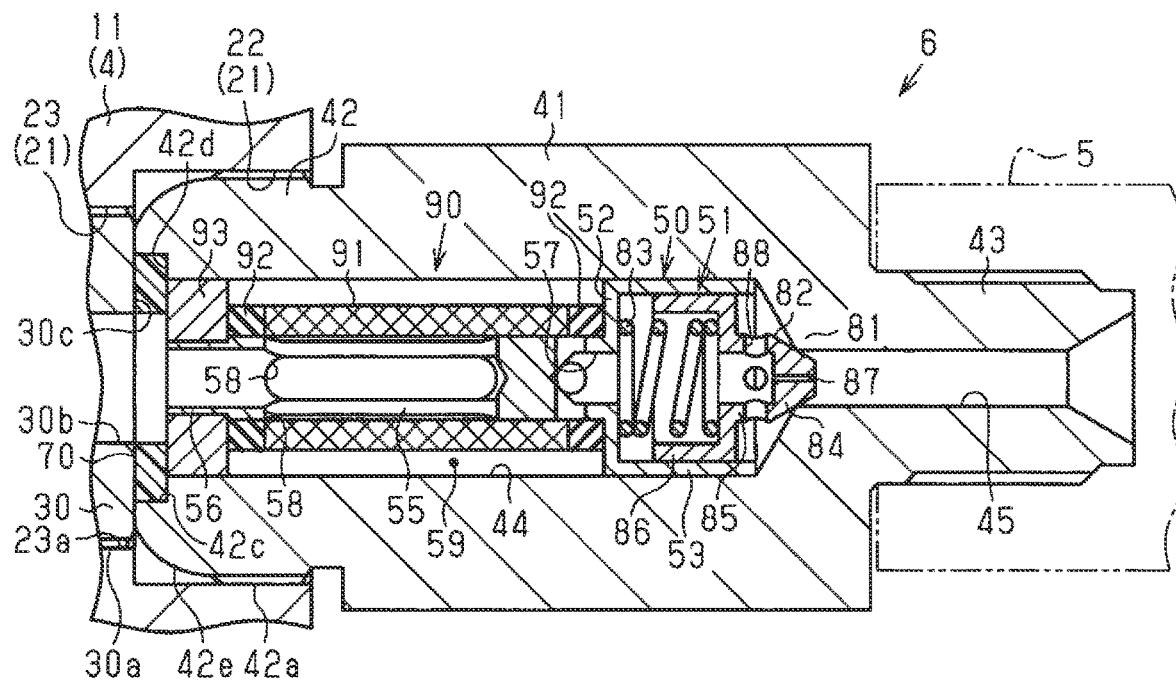
FIG. 6 is a cross-sectional view showing a coupled region of a body and a supply-side joint n a valve device according to a modification example.

For example, as shown in FIG. 6, a change is made such that the columnar portion 54 of the flow passage formation member 52 is dispensed with, and that the valve chamber formation portion 53 and the tubular portion 55 are coupled to each other. A change is made such that the tubular portion 55 is provided with the flow passage 57 that communicates with an interior of the valve chamber formation portion 53. A change is made such that the filter 91 is provided at a position corresponding to radially penetrating regions of the communication passages 58 and the flow passage 57, in the radial direction that is perpendicular to the axis of the throttle valve mechanism accommodation hole 44.

In the present embodiment, the filter portion 90 may be dispensed with. By the same token, the throttle valve mechanism 50 may be dispensed with. In the present embodiment, the tapered surface 42*b* is provided on the tip portion 42 of the supply-side joint 6. However, the supply-side joint 6 may have a tip portion that assumes a simple waistless shape with the tapered surface 42*b* dispensed with.

Besides, the tapered surface 42*b* of the tip portion 42 may be changed as follows. As shown in FIG. 6, an annular arc-like surface 42*e* may be adopted instead of the tapered surface 42*b* of the tip portion 42. The arc-like surface 42*e* is provided such that the outer diameter of the tip portion 42 gradually decreases as the distance to the valve seat fixation member 30 shortens. The arc-like surface 42*e* is provided as a curved surface whose smoothness increases as the distance to the valve seat fixation member 30 shortens.

Besides, in addition to the tapered surface 42*b* and the arc-like surface 42*e*, a change may be made, for example, such that the tip portion 42 assumes the shape of a stepped cylinder. That is, an appropriate change may be made such that the outer periphery of the tip portion 42 becomes unlikely to get hooked on the inner peripheral surface of the first attachment hole 22 when the supply-side joint 6 separates from the first attachment hole 22.

In the present embodiment, the region of the tip portion 42 that faces the valve seat fixation member 30 and the end surface 30*c* of the valve seat fixation member 30 abut on each other, but there may be a gap therebetween. In this case, the sealing member 70 may be compressed between the end surface 30*c* of the valve seat fixation member 30 and the bottom surface 42*d* of the sealing member accommodation portion 42*c*.

Besides, the sealing member accommodation portion 42*e* may be dispensed with. In this case, the sealing member 70 may be provided between the end portion of the tip portion 42 that faces the valve seat fixation member 30 and the end surface 30*c* of the valve seat fixation member 30.

In the present embodiment, the inner diameter of the first attachment hole 22 is larger than the inner diameter of the second attachment hole 23. However, for example, the inner diameter of the first attachment hole 22 and the inner diameter of the second attachment hole 23 may be made equal to each other. In this case, the internal thread is provided at a position corresponding to the external thread 30*a* of the valve seat fixation member 30 on the inner peripheral surface of the attachment hole 21.

Besides, the internal thread 22*a* of the first attachment hole 22 and the external thread 42*a* of the tip portion 42 of the supply-side joint 6 may be dispensed with. In this case, the tip portion 42 is press-fitted into the first attachment hole 22. In the present embodiment, the coil springs 63 and 83 are employed, but the disclosure is not limited thereto. For example, disc springs, elastic bodies or the like may be employed. Besides, in the case where the valving element 62 can be urged toward the valve seat 61 side through the pressure of hydrogen gas, and in the case where the valving element 82 can be urged toward the valve seat 81 side through the pressure of hydrogen gas, there is no need to provide the coil springs 63 and 83, the disc springs, and the elastic bodies.

In the present embodiment, the valve device 1 is attached to the gas tank 2 in which hydrogen gas is stored, but the disclosure is not limited thereto. The valve device 1 may be attached to a gas tank in which a gas other than hydrogen gas is stored.

What is claimed is:

1. A valve device comprising:
a body having a gas flow passage that establishes communication between an interior and an exterior of a gas tank in which high-pressure gas is stored;
a joint that is attached to the body and that connects a pipeline to the gas flow passage;
a check valve that restrains the gas inside the gas tank from flowing backward from the gas flow passage toward the joint and that is equipped with a valve seat having a valve hole and a valving element for opening/closing the valve hole;
a valve seat fixation member that fixes the valve seat to the body, that has a communication hole communicating with the valve hole, and that has an outer peripheral surface with a first external thread; and
a sealing member, wherein
the body has an attachment hole that attaches the joint and the valve seat fixation member from an outside of the body, and that has an inner peripheral surface with a first internal thread screwed to the first external thread,
the sealing member maintains air tightness between the joint and the valve seat fixation member,
an inner diameter of the sealing member is the same as an inner diameter of the communication hole,
an outer peripheral edge of the sealing member is radially inward of the first internal thread and the first external thread and the first internal thread and the first external thread are blocked from a pressure in the gas flow passage by the valve seat and the sealing member,
the joint has a sealing member accommodation portion that accommodates the sealing member at a tip portion of the joint that faces the valve seat fixation member,
the joint has a second external thread on an outer peripheral surface of the joint,
the body has a second internal thread screwed to the second external thread,
the sealing member is compressed between the joint and the valve seat fixation member with an end surface of the tip portion abutting on an end surface of the valve seat fixation member, a maximum outer diameter of the end surface of the tip portion being smaller than a maximum outer diameter of the end surface of the valve seat fixation member,
the joint has a throttle valve mechanism in a throttle valve mechanism accommodation hole on an axis of the communication hole,
the throttle valve mechanism includes a columnar flow passage formation member with a communication passage communicating with the communication hole and forming a gas flow passage communicating with the communication passage by being separated from an inner peripheral surface of the throttle valve mechanism accommodation hole, a cylindrical filter portion between the communication passage and the gas flow passage and that surrounds the columnar flow passage formation member,
the cylindrical filter portion has a cylindrical filter, an annular gasket that restrains foreign matter from entering the communication passage from between the annular gasket and both end portions of the cylindrical filter by sandwiching both the end portions of the cylindrical filter, and an annular fixation member fitted to the columnar flow passage formation member with the annular gasket compressed between the annular fixation member and both the end portions of the cylindrical filter,
an end surface in an axial direction of the annular fixation member abuts an end surface in an axial direction of the sealing member, and
the inner diameter of the sealing member is not the same as an inner diameter of the annular fixation member.

* * * * *